(12) United States Patent
Shibachi

(10) Patent No.: US 10,308,119 B2
(45) Date of Patent: Jun. 4, 2019

(54) VEHICLE POWER SUPPLY CONTROL APPARATUS

(71) Applicant: FUJITSU TEN LIMITED, Kobe-shi, Hyogo (JP)

(72) Inventor: Yoshinori Shibachi, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 0 days.

(21) Appl. No.: 15/453,046

(22) Filed: Mar. 8, 2017

(65) Prior Publication Data

US 2017/0297433 A1    Oct. 19, 2017

(30) Foreign Application Priority Data

Apr. 14, 2016    (JP) .................................. 2016-081215

(51) Int. Cl.
| B60L 3/00 | (2019.01) |
| B60R 16/03 | (2006.01) |
| H02J 7/00 | (2006.01) |
| H02J 7/14 | (2006.01) |
| H02J 7/34 | (2006.01) |

(52) U.S. Cl.
CPC ............ B60L 3/0092 (2013.01); B60R 16/03 (2013.01); H02J 7/00 (2013.01); H02J 7/1423 (2013.01); H02J 7/345 (2013.01); B60L 2210/10 (2013.01); Y02T 10/7216 (2013.01)

(58) Field of Classification Search
CPC ..... B60L 3/0092; B60L 2210/10; B60R 16/03
See application file for complete search history.

(56) References Cited

U.S. PATENT DOCUMENTS

| 5,488,283 | A | * | 1/1996 | Dougherty | .......... B60L 11/1855 307/10.1 |
| 5,739,668 | A | * | 4/1998 | Nishikiori | ............. H02J 7/0036 320/111 |
| 6,979,977 | B2 | * | 12/2005 | Amano | .................... H02J 9/002 307/10.1 |
| 7,202,574 | B2 | * | 4/2007 | Jabaji | ........................ B60L 1/00 307/10.1 |
| 9,670,891 | B2 | * | 6/2017 | Miyake | ............... F02N 11/0866 |
| 9,705,319 | B2 | * | 7/2017 | Morita | ................ H01M 10/425 |

FOREIGN PATENT DOCUMENTS

| JP | 2011-004556 A | 1/2011 |
| JP | 2016-103907 A | 6/2016 |

* cited by examiner

*Primary Examiner* — Daniel Kessie
(74) *Attorney, Agent, or Firm* — Oliff PLC

(57) ABSTRACT

A vehicle power supply control apparatus controls (i) storage of electricity generated by an alternator powered by an internal combustion engine of a vehicle and (ii) main and auxiliary power supplies that supply stored electricity to a load. The apparatus includes a first switch, a second switch, a controller and a switching circuit. The first switch is provided between the main power supply and the alternator. The second switch is provided between the auxiliary power supply and the alternator. The controller controls a connection state of the first switch and a connection state of the second switch based on a state of the vehicle. The switching circuit turns on the first switch and/or the second switch in a case where a first voltage of the main power supply is smaller than a second voltage of the auxiliary power supply by a threshold value or greater.

10 Claims, 11 Drawing Sheets

| TRAVELLING STATE | NORMAL TRAVELLING | SLOWING DOWN | | | |
|---|---|---|---|---|---|
| | | | | | STOPPED |
| VEHICLE SPEED | 60km/h | 60 – 25km/h | 25 – 0km/h | | | 0km/h |
| ENGINE | DRIVING | DRIVING | STOPPED (IDLING STOP) | | |
| LOAD CURRENT | SMALL | SMALL | SMALL | LARGE | SMALL | SMALL |
| STATE OF LEAD-ACID BATTERY | NORMAL | NORMAL | NORMAL | NORMAL | DEFECTIVE | NORMAL |
| VOLTAGE COMPARISON | V1=V2 | V1=V2 | V1>V2 | V1<V2 | V1<V2 | V1>V2 |
| SW1 | ON | ON | OFF | ON | ON | OFF |
| SW2 | ON | ON | ON | ON | ON | ON |
| DC-DC | STOPPED | STOPPED | OPERATING | STOPPED | STOPPED | OPERATING |

FIG. 5A

VEHICLE POWER SUPPLY CONTROL APPARATUS

BACKGROUND OF THE INVENTION

Field of the Invention

The invention relates to a vehicle power supply control apparatus.

Description of the Background Art

Conventionally, a technology that controls charging/discharging of a lead-acid battery and a capacitor that are mounted on a vehicle has been known. Using the technology, an apparatus that is connected to the lead-acid battery and the capacitor controls a load, such as a car audio (ex. Japanese Patent Application Laid-open Publication No. 2011-4556).

However, the conventional technology merely controls the charging/discharging of the lead-acid battery and the capacitor based on a state of the vehicle and does not consider redundancy of a vehicle power supply. A voltage of the lead-acid battery may sudden drop, for example, when a relatively large current momentarily flows into a load, such as when an automatic brake is activated. Even in such a case, it is recommended that power should be stably supplied to the load by ensuring the redundancy for the vehicle power supply.

SUMMARY OF THE INVENTION

According to one aspect of the invention, a vehicle power supply control apparatus (i) controls storage of electricity generated by an alternator that is powered by an internal combustion engine of a vehicle and (ii) controls a main power supply and an auxiliary power supply that supply the electricity stored therein to a load. The vehicle power supply control apparatus includes: a first switch that is provided between the main power supply and the alternator; a second switch that is provided between the auxiliary power supply and the alternator; a microcomputer that controls a connection state of the first switch and a connection state of the second switch based on a state of the vehicle; and a switching circuit that turns on the first switch and/or the second switch in a case where a first voltage of the main power supply is smaller than a second voltage of the auxiliary power supply by a threshold value or greater.

Thus, redundancy of vehicle power supply can be ensured.

According to another aspect of the invention, the switching circuit controls the first and second switches so that the first and second switches both are on when the first voltage of the main power supply becomes smaller than the second voltage of the auxiliary power supply by the threshold value or greater while the internal combustion engine is stopped while the vehicle is slowing down at a first predetermined speed or lower.

Thus, double redundancy of the vehicle power supply can be ensured.

Therefore, an object of the invention is to provide a vehicle power supply control apparatus that has redundant vehicle power supply.

These and other objects, features, aspects and advantages of the invention will become more apparent from the following detailed description of the invention when taken in conjunction with the accompanying drawings.

BRIEF DESCRIPTION OF THE DRAWINGS

FIG. 4A explains states of elements of the power supply control apparatus;

FIG. 4B explains states of the elements of the power supply control apparatus;

FIG. 5A shows states of elements of a vehicle;

DESCRIPTION OF THE EMBODIMENTS

With reference to the drawings, details of an embodiment of a vehicle power supply control apparatus of the invention will be described below. The invention is not limited to the embodiment below. First, an outline of a power supply control method of the embodiment will be described with reference to FIG. 1A and FIG. 1B.

Figure 1A:
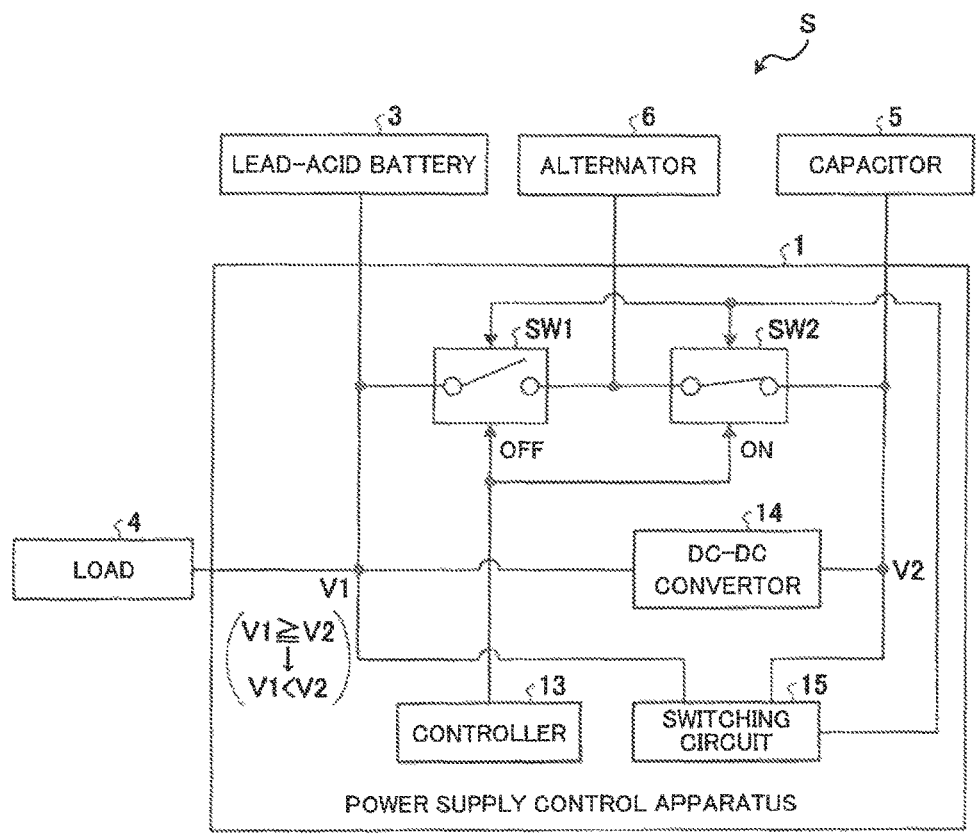
FIG. 1A illustrates an outline of a power supply control method of an embodiment.
Figure 1B:
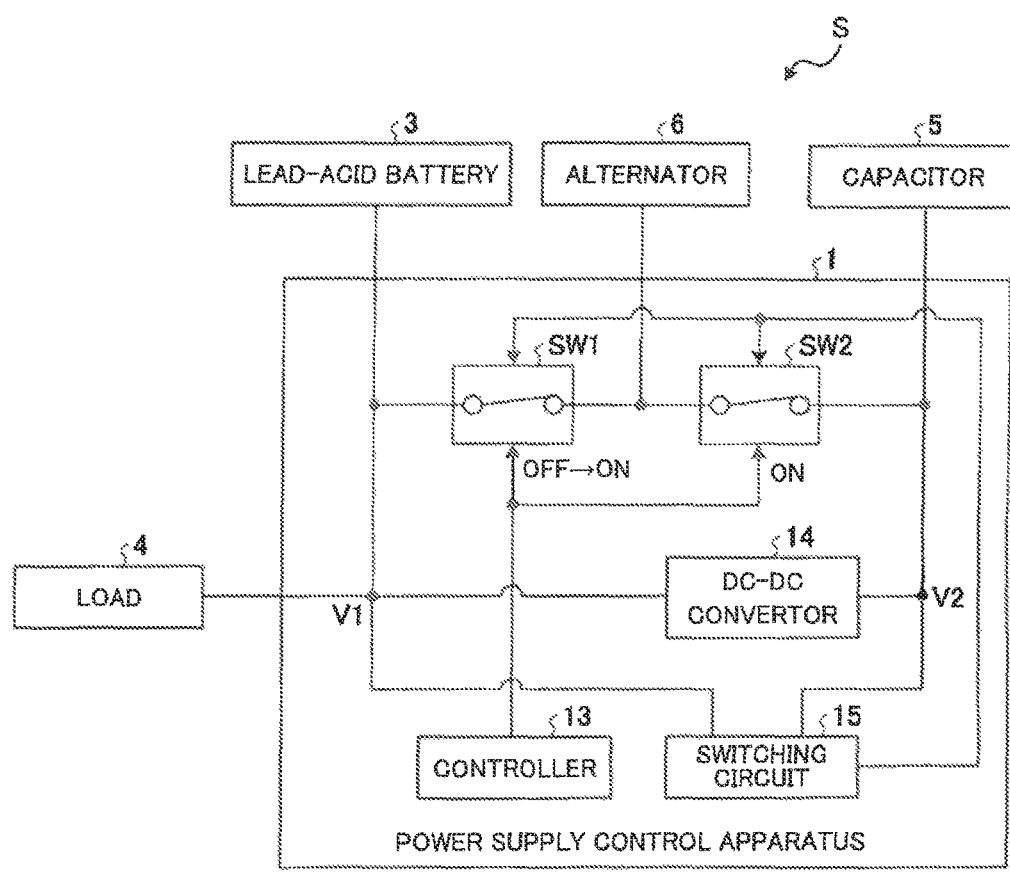
FIG. 1B illustrates an outline of the power supply control method of the embodiment.

Each of FIGS. 1A and 1B illustrates the outline of the power supply control method of the embodiment. The power supply control method of the embodiment is performed by a vehicle power supply control apparatus 1 (referred to also as power supply control apparatus 1) of a vehicle power supply system S (referred to also as power supply system S) that is mounted on a vehicle. FIGS. 1A and 1B illustrates elements necessary to explain the power supply control method, and other elements are omitted.

First, a configuration of the power supply system S will be described. As shown in FIGS. 1A and 1B, the power supply system S includes: an alternator 6 that is powered by a combustion engine of the vehicle; a main power supply 3 and an auxiliary power supply 5 that (i) both store electricity generated by the alternator 6 and (ii) supply the stored electricity to a load 4; and the power supply control apparatus 1. Here, in FIG. 1A, the main power supply 3 is a lead-acid battery, and the auxiliary power supply 5 is a capacitor.

The power supply control apparatus 1 includes a first switch SW1, a second switch SW2, a controller 13, a DC-DC convertor 14 and a switching circuit 15. The first switch SW1 is provided between the lead-acid battery 3 and the alternator 6. The second switch SW2 is provided between the capacitor 5 and the alternator 6.

The controller 13 controls a connection state of each of the first and second switches SW1 and SW2 based on a state of the vehicle. The DC-DC convertor 14 boosts or decreases a voltage V2 of the capacitor 5 to a voltage V1. In a case where the voltage V1 of the lead-acid battery 3 is smaller than the voltage V2 of the capacitor 5 by a predetermined value or greater, the switching circuit 15 turns on the first switch SW1 and/or the second switch SW2.

Next, the power supply control method of this embodiment will be described with reference to FIGS. 1A and 1B. The controller 13 of the power supply control apparatus 1 controls the connection state of each of the first and second switches SW1 and SW2 based on the state of the vehicle. FIG. 1A illustrates the connection states of the first and second switches SW1 and SW2 in a case where, for example, the vehicle is slowing down at a predetermined vehicle speed or lower while the combustion engine is stopped, in other words, in a case where a vehicle speed is at the predetermined vehicle speed or lower while the vehicle is in a so-called idling stop state.

In this case, the controller 13 of the power supply control apparatus 1 controls the first switch SW1 to be off and controls the second switch SW2 to be on. Thus, the lead-acid battery 3 is connected to the load 4, and the capacitor 5 is connected to the load 4 via the DC-DC convertor 14. Thus, the electricity is supplied to the load 4 from the lead-acid battery 3 and the capacitor 5. At this time point, the voltage V1 of the lead-acid battery 3 is equal to or greater than the voltage V2 of the capacitor 5 (V1≥V2).

Here, for example, there is a case in which an automatic brake system mounted on the vehicle is activated while the combustion engine is being stopped. Even in a case where the vehicle is slowing down at a first predetermined speed or lower, the vehicle is travelling so that the automatic brake system may be activated to prevent a collision with an obstacle. In order to prevent the collision, it is necessary to instantly flow a relatively large current into the load 4 to start the automatic brake system.

However, since the combustion engine is being stopped, the alternator 6 stops generating electricity so that the alternator 6 cannot supply the electricity to the load 4. Moreover, the DC-DC convertor 14 is a circuit that boosts the voltage V2 to the voltage V1, but current flowing in the DC-DC convertor 14 is relatively small. In order to flow a large current in the DC-DC convertor 14, the circuit become larger and a larger size will become a problem. Therefore, it is difficult to instantly flow the relatively large current via the DC-DC convertor 14. In this case, for example, the voltage V1 of the lead-acid battery 3 decreases so that the relatively large current cannot be provided to the load 4. Thus, for example, the automatic brake system cannot be activated.

Therefore, even in such a case, the power supply control method of this embodiment continuously supplies necessary electricity to the load 4 because the switching circuit 15 of the power supply control apparatus 1 switches the connection states of the first and second switches SW1 and SW2.

More specifically, in a case where the voltage V1 of the lead-acid battery 3 is smaller than the voltage V2 of the capacitor 5 by a threshold value or greater, i.e. in a case where the voltage V1 of the lead-acid battery 3 is smaller than the voltage V2 of the capacitor 5 and where the difference between the voltage V1 and the voltage V2 is equal to or greater than the threshold value, the switching circuit 15 of the power supply control apparatus 1 turns on at least one of the first switch SW1 and the second switch SW2. Here, a case in which the threshold value is 0 (zero) V will be described. In this case, for example, when the voltage V1 of the lead-acid battery 3 becomes smaller than the voltage V2 of the capacitor 5 (V1<V2) because a relative large current flows into the load 4, the switching circuit 15 turns on the first switch SW1 from being off, as shown in FIG. 1B. Thus, the capacitor 5 is directly connected to the load 4 so that the relatively large current can be provided from the capacitor 5 to the load 4.

As described above, in the power supply control method of this embodiment, the switching circuit 15 turns on at least one of the first and second switches SW1 and SW2 based on the voltage V1 of the lead-acid battery 3 and the voltage V2 of the capacitor 5. Thus, in a case where the electricity cannot be provided only by the lead-acid battery 3, the electricity can be provided from the capacitor 5. Thus, redundancy of the power supply can be ensured.

In the drawings, the first switch SW1, the second switch SW2, the DC-DC convertor 14, the lead-acid battery 3, the capacitor 5 and the alternator 6 may be also abbreviated as "SW1," "SW2," "DC-DC," "Pb," "Cap," and "Alt."

Figure 2:
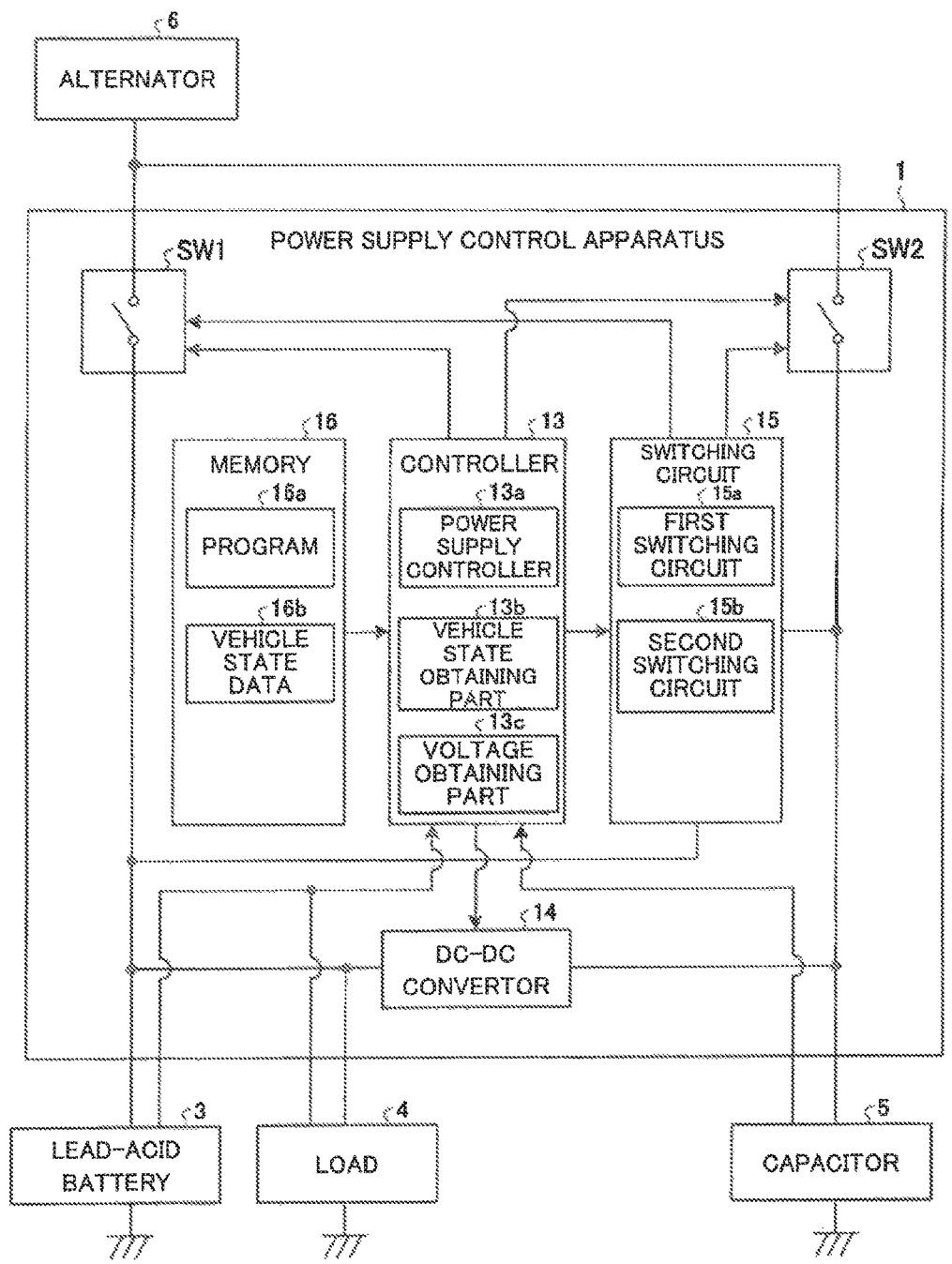
FIG. 2 illustrates a block diagram of a power supply control apparatus of the embodiment.

A configuration of the power supply control apparatus 1 will be described with reference to FIG. 2. FIG. 2 illustrates a block diagram of the power supply control apparatus 1 of this embodiment. The power supply control apparatus 1 is connected to the lead-acid battery 3, the load 4, the capacitor 5 and the alternator 6.

The lead-acid battery 3 is a secondary battery using lead for electrodes. The lead-acid battery 3 is a main power supply for electric devices mounted on a vehicle 2. In other words, the lead-acid battery 3 is a main power source of a power source P.

The load 4 is the electric device mounted on the vehicle 2. Some examples of the electric devices are a navigation apparatus, audio, an air-conditioner, lights, a power steering system, the automatic brake system, etc. A current amount consumed by the load 4 increases and decreases based on an operation state of the load 4.

The capacitor 5 is a rechargeable battery that stores charge. The capacitor 5 is, for example, a condenser. The capacitor 5 may be a battery that is rechargeable, such as a lithium-ion secondary battery. The capacitor 5 functions as an auxiliary power supply of the lead-acid battery 3, i.e. the auxiliary power supply of the power source P.

The alternator 6 uses rotation of an engine EN as a power source to generate the electricity (refer to FIG. 2). Moreover, when the vehicle 2 slows down, the alternator 6 generates regenerative power from a regenerative brake. The alternator 6 is also called a power generator.

The power supply control apparatus 1 includes the first switch SW1, the second switch SW2, the controller 13, the DC-DC convertor 14, the switching circuit 15 and a memory 16.

The first and second switches SW1 and SW2 are switches (relays) that control a circuit of the power supply control apparatus 1 to be closed or opened. The first and second switches SW1 and SW2 are, for example, bipolar transistors or field-effect transistors (FET), especially, metal-oxide-semiconductor field-effect transistors (MOSFET). Moreover, a mechanical relay may be used.

The first switch SW1 is provided between the lead-acid battery 3 and the alternator 6. The second switch SW2 is provided between the capacitor 5 and the alternator 6. One side of the first switch SW1 is connected to one side of the second switch SW2. The first and second switches SW1 and SW2 are controlled to be turned on or off by the controller 13, described later, and the first and second switches SW1 and SW2 are turned on by the switching circuit 15, described later.

The controller 13 is a microcomputer including a CPU, a RAM and a ROM. The controller 13 controls the entire power supply control apparatus 1. The controller 13 includes a power supply controller 13a, a vehicle state obtaining part 13b and a voltage obtaining part 13c.

The power supply controller 13a controls the connection states of the first and second switches SW1 and SW2 and an operating state of the DC-DC convertor 14 based on a voltage of the lead-acid battery 3 and a voltage of the capacitor 5, a current consumed by the load 4, the state of the vehicle 2, etc. Moreover, the power supply controller 13a controls whether or not the switching circuit 15 needs to switch at least one of the first and second switches SW1 and SW2.

The vehicle state obtaining part 13b obtains the state of the vehicle 2 from a vehicle-mounted sensor SN (not illustrated). The term "state of the vehicle 2" means a travelling state of the vehicle 2 and a driving state of the engine EN. The travelling state of the vehicle 2 means a travelling speed of the vehicle 2, for example, a state in which the vehicle 2 is travelling or is slowing down. Based on a signal output from a vehicle speed sensor (not illustrated), the vehicle state obtaining part 13b determines the state of the vehicle 2, for example, the state in which the vehicle 2 is travelling or the state in which the vehicle 2 is slowing down. The term "driving state of the engine EN" means a state in which the engine EN is driving or is stopped. The voltage obtaining part 13c obtains the voltages V1 of the lead-acid battery 3 and the V2 of the capacitor 5. The vehicle state obtaining part 13b and the voltage obtaining part 13c output the obtained states and the obtained voltages, respectively, to the power supply controller 13a.

The DC-DC convertor 14 is a direct-current transducer that converts a direct voltage to another direct voltage. Here, the DC-DC convertor 14 is a transformer that boosts and decreases the direct voltage. The DC-DC convertor 14 is provided between the lead-acid battery 3 and the capacitor 5 and also between the load 4 and the capacitor 5. Moreover, one end of the DC-DC convertor 14 is connected to the first switch SW1 and another end is connected to the second switch SW2.

In a case where the voltage of the lead-acid battery 3 is smaller than the voltage of the capacitor 5 by the threshold value or greater, the switching circuit 15 turns on the first switch SW1 and/or the second switch SW2. The switching circuit 15 includes a first switching circuit 15a that turns on the first switch SW1 and a second switching circuit 15b that turns on the second switch SW2.

Figure 3:
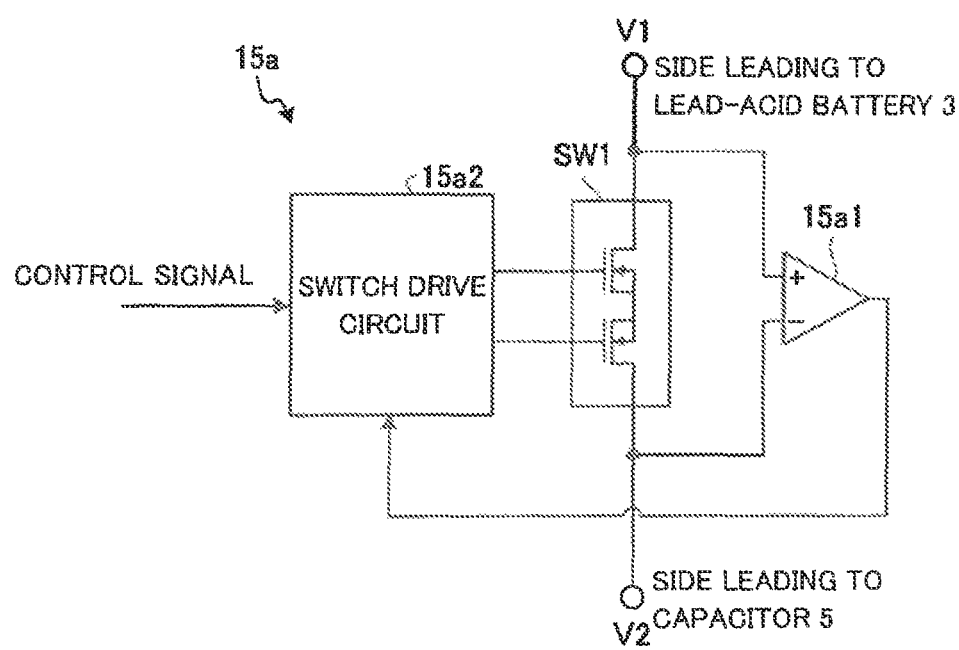
FIG. 3 illustrates an example of a circuit configuration of a first switching circuit.

With reference to FIG. 3, a configuration of the first switching circuit 15a will be described. FIG. 3 illustrates an example of a circuit configuration of the first switching circuit 15a. The second switching circuit 15b has a same configuration as the configuration of the first switching circuit 15a except one point that an object to be switched by the second switching circuit 15b is the second switch SW2. Thus, an explanation of the second switching circuit 15b is omitted.

As shown in FIG. 3, the first switching circuit 15a includes a comparator 15a1 and a switch drive circuit 15a2. The comparator 15a1 performs a comparison between the voltage V1 of the lead-acid battery 3 and the voltage V2 of the capacitor 5. The comparator 15a1 outputs a result of the comparison to the switch drive circuit 15a2.

In a case where a control signal output by the power supply controller 13a is an allowing signal that allows the first switch SW1 to be turned on, the switch drive circuit 15a2 turns on the first switch SW1 based on the result of the comparison performed by the comparator 15a1. Here, the power supply controller 13a outputs the allowing signal, for example, in a case where the first switch SW1 is off and where the first switching circuit 15a is allowed to perform a switching operation.

The switch drive circuit 15a2 is a so-called gate driver circuit, and turns on the first switch SW1 by applying a predetermined voltage to a gate of the first switch SW1 configured with, for example, a MOSFET.

Each of the comparator 15a1 and the switch drive circuit 15a2 can be configured with an analogue circuit. As described above, the first switching circuit 15a configured with an analogue circuit turns on the first switch SW1 so that the first switching circuit 15a can turn on the first switch SW1 faster than the first switching circuit 15a turns on the first switch SW1 via the controller 13. Thus, it is possible to shorten a time period from a time point at which the voltage of the lead-acid battery 3 decreases to a time point at which the capacitor 5 supplies electricity. Thus, the electricity can be stably provided to the load 4.

Here, the first switching circuit 15a switches the first switch SW1 based on the voltages of the lead-acid battery 3 and the capacitor 5. However, a changing timing is not limited to this. For example, in a case where the power supply controller 13a controls the connection state of the first switch SW1 based on the state of the vehicle 2, the first switch SW1 may be controlled via the switch drive circuit 15a2. In this case, the power supply controller 13a inputs a second control signal indicative of the connection state of the first switch SW1 in addition to the allowing signal that allows the first switching circuit 15a to turn on the first switch SW1. The first switching circuit 15a controls the first switch SW1 based on the second control signal. In this case, too, when the first switching circuit 15a receives the allowing signal that allows the first switching circuit 15a to turn on the first switch SW1 and, at the same time, when the voltage of the lead-acid battery 3 decreases, the first switching circuit 15a turns on the first switch SW1, regardless of the second control signal.

With reference back to FIG. 2, the memory 16 stores data. The memory 16 is a nonvolatile memory, such as a hard disk including an electrical erasable programmable read-only memory (EEPROM), a flash memory or a magnetic disk. The memory 16 stores a program 16a and vehicle state data 16b.

The program 16a is firmware that is read out and executed by the controller 13 to control the power supply control apparatus 1. The vehicle state data 16b is a data table including data regarding, for example, "the vehicle state," "the connection state of the first switch," "the connection state of the second switch," "an operating state of the DC-DC converter," "a controlling state of the power supply control apparatus," etc. The vehicle state data 16b is looked up when the power supply controller 13a controls the first and second switches SW1 and SW2, the DC-DC convertor 14 and the switching circuit 15.

Figure 4A:
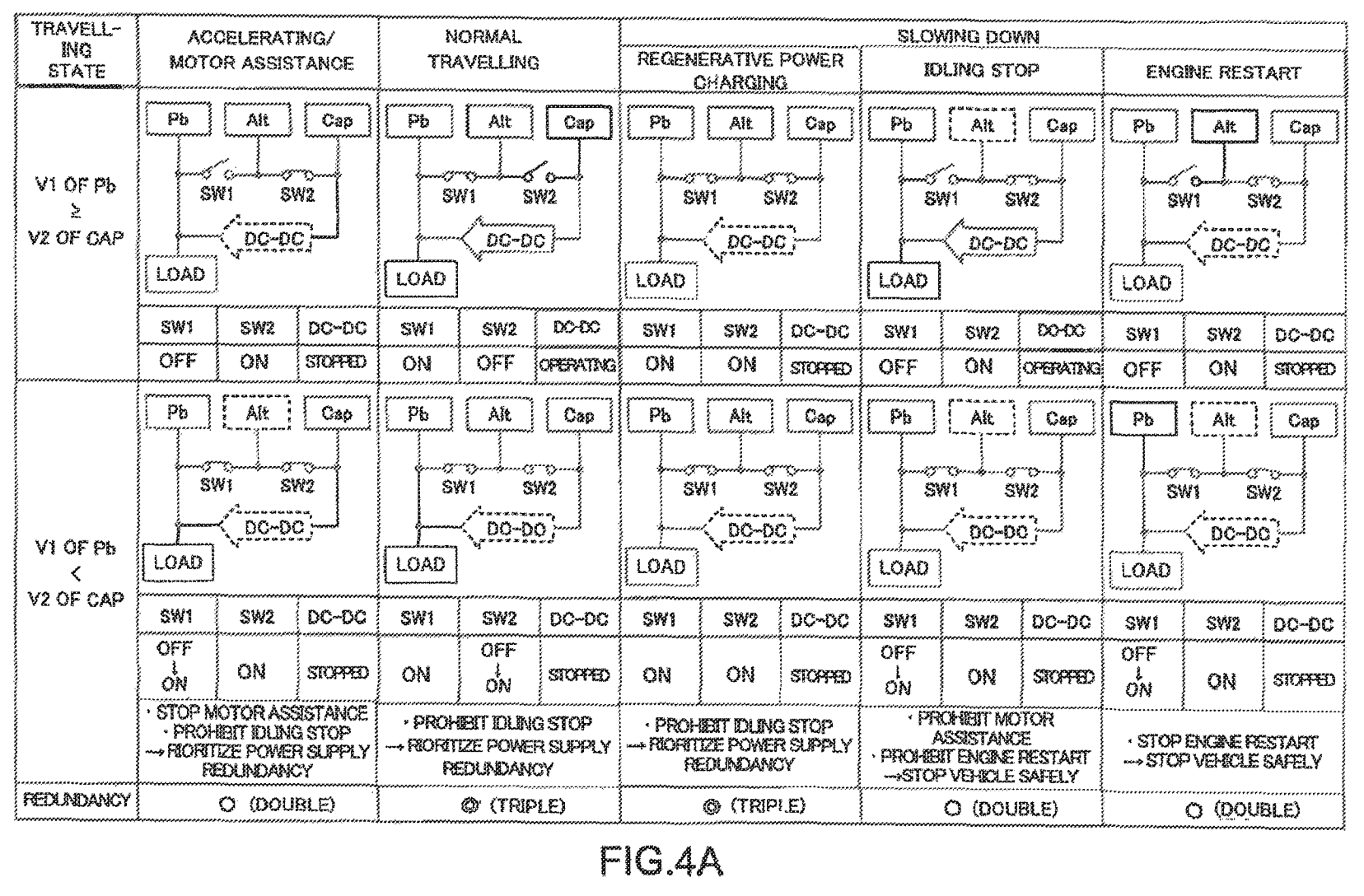
Figure 4B:
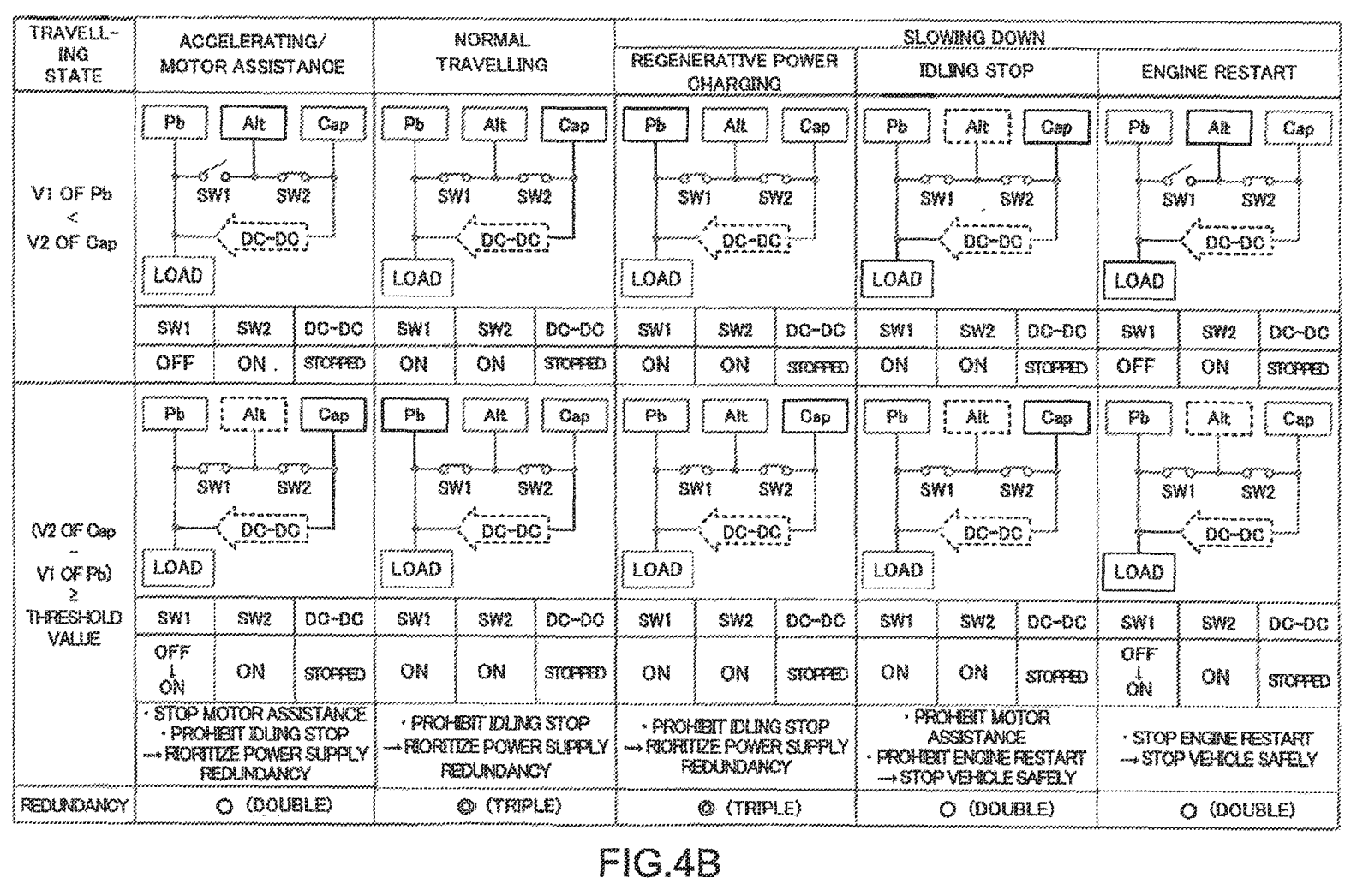

Next described is relations among the travelling state of the vehicle 2, the connection state of the first switch SW1, the connection state of the second switch SW2 and the operating state of the DC-DC convertor 14, with reference to FIG. 4A and FIG. 4B. FIG. 4A and FIG. 4B explain states of elements of the power supply control apparatus 1. In FIGS. 4A and 4B, numerical references are omitted to simplify the drawings.

With reference to FIG. 4A, first described is: the states of the elements of the power supply control apparatus 1 in a case where the voltage V1 of the lead-acid battery 3 is equal to or greater than the voltage V2 of the capacitor 5; and states of the elements of the power supply control apparatus 1 in a case where the voltage V1 of the lead-acid battery 3 decreases. Moreover, redundancy of the power supply (power supply redundancy) is important for activating a load relating to safety, such as the automatic brake system, while the vehicle 2 is travelling. Here, a state in which the vehicle 2 is travelling will be explained as the travelling state of the vehicle 2, and an explanation of a state in which the vehicle 2 is stopped will be omitted.

As shown in FIG. 4A, the travelling state of the vehicle 2 is divided into three major categories: an "accelerating state/motor assistance state" in which the vehicle 2 accelerates or in which the vehicle 2 is driven by a motor, instead of the engine EN; a normal travelling state in which the vehicle 2 is constantly travelling at a second predetermined speed or greater; and a slowing-down state in which the vehicle 2 is slowing down at the first predetermined speed or lower. Moreover, the slowing-down state as the travelling state includes: a "regenerative power charging state" in which a regenerative brake of the alternator 6 generates regeneration power; and an "idling stop state" in which driving of the engine EN is being stopped; and an "engine restart state" in which the engine EN is restarted from the idling stop state.

First, in a case where the travelling state of the vehicle 2 is the "normal travelling state," while the voltage V1 of the lead-acid battery 3 is equal to or greater than the voltage V2 of the capacitor 5: the first switch SW1 is on; the second switch SW2 is off; and the DC-DC convertor 14 is in an operating state. Thus, the voltage V2 of the capacitor 5 is boosted and voltage is supplied to the load 4.

Then, in a case where the voltage V1 of the lead-acid battery 3 becomes smaller than the voltage V2 of the capacitor 5 because, for example, the automatic brake system starts operating, the switching circuit 15 turns on the second switch SW2 regardless of control of the second switch SW2 by the controller 13. Moreover, the switching circuit 15 stops the DC-DC convertor 14. The operating state of the DC-DC convertor 14 may be controlled by the controller 13, or the DC-DC convertor 14 may be stopped by the switching circuit 15.

Thus, the capacitor 5 is directly connected to the load 4 so that the three power supplies of the lead-acid battery 3, the alternator 6 and the capacitor 5 can supply electricity to the load 4. Therefore, the power supply redundancy of the power supply system S is tripled. In other words, the power supply system S has triple power supply redundancy. As described above, the power supply redundancy can be ensured.

Moreover, the controller 13 prohibits the travelling state of the vehicle 2 from being changed to the idling stop state. Thus, the power supply redundancy of the power supply system S is preferentially ensured. Therefore, the load relating to safety, such as the automatic brake system, can be stably operated.

In a case where the travelling state of the vehicle 2 is "the regenerative power charging state," while the voltage V1 of the lead-acid battery 3 is equal to or greater than the voltage V2 of the capacitor 5, the first and second switches SW1 and SW2 are on and the DC-DC convertor 14 is in a stopped state. In this case, the first and second switches SW1 and SW2 are on so that the power supply redundancy of the power supply system S is ensured. Thus, even if the Voltage V1 decreases, the switching circuit 15 is not activated and the status quo is maintained. In this case, the controller 13 prohibits the travelling state of the vehicle 2 from being changed to the idling stop state. Thus, the power supply redundancy of the power supply system S is tripled so that the power supply system S has the triple power supply redundancy. Moreover, the load relating to safety, such as the automatic brake system, can be stably operated.

In a case where the travelling state of the vehicle 2 is the "idling stop state," while the voltage V1 of the lead-acid battery 3 is equal to or greater than the voltage V2 of the capacitor 5: the first switch SW1 is off; the second switch SW2 is on; and the DC-DC convertor 14 is in the operating state. Thus, the voltage V2 of the capacitor 5 is boosted, and the voltage is supplied to the load 4. Since the engine EN is stopped, the alternator 6 is not operating.

Then, in a case where the voltage V1 of the lead-acid battery 3 becomes smaller than the voltage V2 of the capacitor 5 because, for example, the automatic brake system starts operating, the switching circuit 15 turns on the first switch SW1 regardless of control of the first switch SW1 by the controller 13. Moreover, the switching circuit 15 stops the DC-DC convertor 14.

Thus, the capacitor 5 is directly connected to the load 4 so that the lead-acid battery 3 and the capacitor 5 can supply the electricity to the load 4. Therefore, the power supply redundancy of the power supply system S is doubled. In other words, the power supply system S has double power supply redundancy. As described above, the power supply redundancy can be ensured.

Moreover, the controller 13 prohibits the travelling state of the vehicle 2 from being changed to the motor assistance state or to the engine restart state. Thus, the power supply redundancy of the power supply system S is preferentially ensured. Therefore, the load relating to safety, such as the automatic brake system, can be stably operated and thus the vehicle 2 can be safely stopped.

This embodiment has been explained the case in which the controller 13 controls the first switch SW1 to be off while the travelling state of the vehicle 2 is the idling stop state. However, the controller 13 may control the second switch SW2 to be off.

In a case where the travelling state of the vehicle 2 is "the accelerating state/motor assistance state" or "the engine restart state," while the voltage V1 of the lead-acid battery 3 is equal to or greater than the voltage V2 of the capacitor 5: the first switch SW1 is off; the second switch SW2 is on; and the DC-DC convertor 14 is in the stopped state. Thus, voltage is supplied to the load 4 from the lead-acid battery 3.

Then, in a case where the voltage V1 of the lead-acid battery 3 becomes smaller than the voltage V2 of the capacitor 5 because, for example, the automatic brake system starts operating, the switching circuit 15 turns on the first switch SW1 regardless of the control of the first switch SW1 by the controller 13.

Thus, the capacitor 5 is directly connected to the load 4 so that the lead-acid battery 3 and the capacitor 5 can supply the electricity to the load 4. Therefore, the power supply redundancy of the power supply system S is doubled. In other words, the power supply system S has double power supply redundancy.

Moreover, the controller 13 stops motor assistance and engine restart. Further, in a case where the vehicle 2 is in the accelerating state/motor assistance state, the controller 13 stops the motor assistance, and prohibits the travelling state of the vehicle 2 from being changed to the idling stop state. Thus, the power supply redundancy of the power supply system S is preferentially ensured. Therefore, the load relating to safety, such as the automatic brake system, can be stably operated, and thus the vehicle 2 can be safely stopped.

With reference to FIG. 4B, next described is: states of the elements of the power supply control apparatus 1 in a case where the voltage V1 of the lead-acid battery 3 is smaller than the voltage V2 of the capacitor 5; and states of the elements of the power supply control apparatus 1 in a case where the voltage V1 of the lead-acid battery 3 further decreases. In a case where the travelling state of the vehicle 2 is "the normal travelling state," "the regenerative power charging state," or "the idling stop state," the first and second switches SW1 and SW2 are on and the DC-DC convertor 14 is in the stopped state. In other words, the states of the elements of the power supply control apparatus 1 is same as the state of the elements of the power supply control apparatus 1 in a case where the voltage V1 of the lead-acid battery 3 is equal to or greater than the voltage V2 of the capacitor 5 and where the travelling state of the vehicle 2 is "the regenerative power charging state." In this case, the power supply redundancy of the power supply system S is ensured. Therefore, even in a case, for example, where the voltage V1 of the lead-acid battery 3 decreases and where a difference between the voltage V2 of the capacitor 5 and the voltage V1 of the lead-acid battery 3 is equal to or greater than the threshold value (the voltage V2 of the capacitor 5–the voltage V1 of the lead-acid battery 3≥threshold value), the switching circuit 15 is not activated and the status quo is maintained. Moreover, the controller 13 prohibits the travelling state of the vehicle 2 from being changed to, for example, the idling stop state, the motor assistance state and the engine restart state.

In a case where the travelling state of the vehicle 2 is "the accelerating state/motor assistance state" or "the engine restart state," the states of the elements are the same as the case where the voltage V1 of the lead-acid battery 3 is equal to or greater than the voltage V2 of the capacitor 5. Therefore, an explanation is omitted.

Figure 5B:
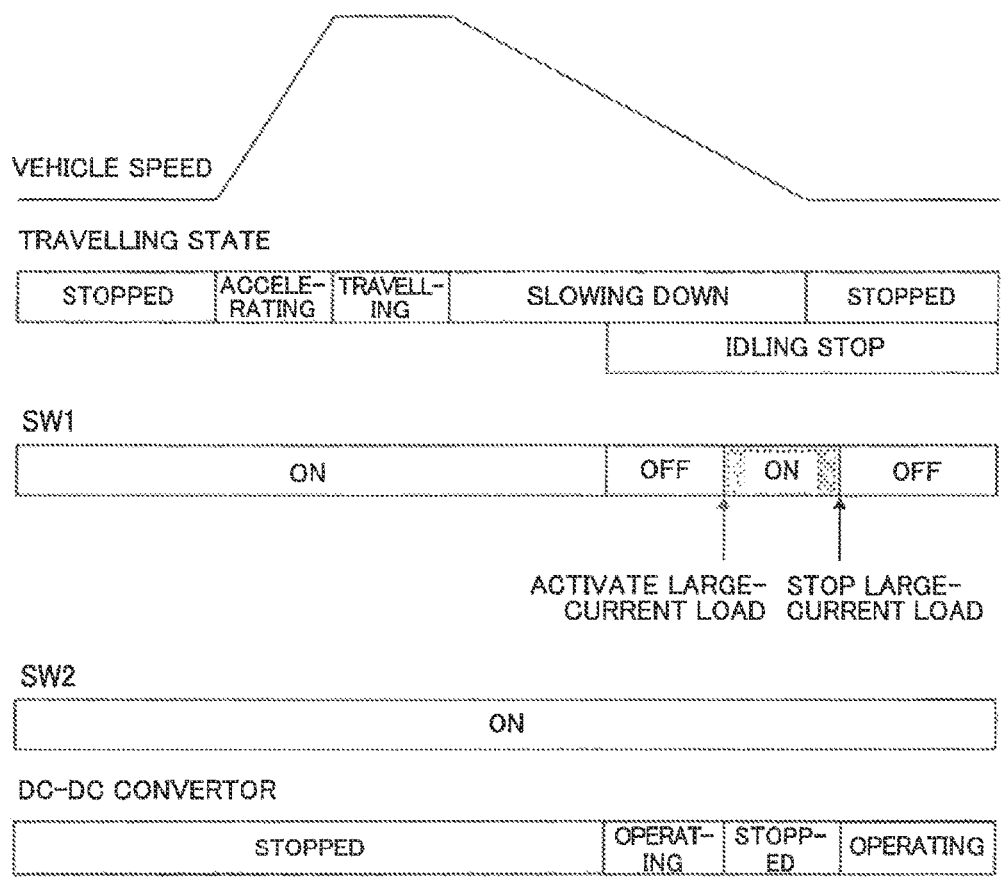
FIG. 5B shows examples of chronological changes of the elements of the vehicle.

With reference to FIGS. 5A and 5B, other examples of the elements of the vehicle 2 will be explained. FIG. 5A shows states of the elements of the vehicle 2. FIG. 5B shows examples of chronological changes of the elements of the vehicle 2.

As shown in FIG. 5A, the normal travelling state, the slowing-down state and a vehicle stopped state are among the travelling state of the vehicle 2. Moreover, an operating state and the stopped (idling stop) state are among the state of the engine EN. A normal state and a defect state are among a state of the lead-acid battery 3. If the lead-acid battery 3 is in the defect state due to, for example, a problem of the lead-acid battery 3, the voltage V1 of the lead-acid battery 3 decreases.

For example, in the normal travelling state or in a state in which the vehicle 2 is slowing down at the first predetermined speed (e.g. 25 km/h in FIG. 5A) or lower, the engine EN is in the operating state. Here, in a case where load current is small and the lead-acid battery 3 is normal, the power supply control apparatus 1 controls the elements such that the first and second switches SW1 and SW2 are on and that the DC-DC convertor 14 is in the stopped state.

Moreover, in a case where the vehicle is slowing down at the first predetermined speed or lower, the engine is in the idling stop state so that the engine EN is stopped. Here, in the case where the load current is small and the lead-acid battery 3 is normal, the power supply control apparatus 1 controls the elements such that: the first switch SW1 is off; the second switch SW2 is on; and the DC-DC convertor 14 is in the operating state.

On the other hand, in a case where the load current becomes larger, the power supply control apparatus 1 controls the elements such that the first and second switches SW1 and SW2 are on and that the DC-DC convertor 14 is in the stopped state. Moreover, even in the case where the load current is small, when the lead-acid battery 3 is defective so that the voltage V1 of the lead-acid battery 3 is smaller than the voltage V2 of the capacitor 5, the power supply control apparatus 1 controls the elements such that the first and second switches SW1 and SW2 are on and that the DC-DC convertor 14 is in the stopped state.

As described above, not only in a case where a large load current flows, but also in a case, for example, where the lead-acid battery 3 is defective, the voltage V1 of the lead-acid battery 3 decreases. The power supply control apparatus 1 of this embodiment can ensure the power supply redundancy even in the case, for example, where the lead-acid battery 3 is defective.

Moreover, while the DC-DC convertor 14 is in the operating state, in other words, while the capacitor 5 supplies the electricity to the load 4 via the DC-DC convertor 14, when the voltage V1 of the lead-acid battery 3 becomes smaller than the voltage V2 of the capacitor 5, the power supply control apparatus 1 turns on the first switch SW1. Thus, in the case where the voltage V1 of the lead-acid battery 3 decreases while the DC-DC convertor 14 is operating, the power supply redundancy can be ensured.

Moreover, in a case where the traveling speed of the vehicle is 0 (zero) km/h so that the vehicle 2 is in the vehicle stopped state, the automatic brake system is stopped. Therefore, in a case where the lead-acid battery 3 is in the normal state, the power supply control apparatus 1 controls the elements such that the first switch SW1 is off, and that the second switch SW2 is on, and that the DC-DC convertor 14 is in the operating state.

As shown in FIG. 5B, next described will be a case in which the vehicle 2 is travelling. In the examples shown in FIG. 5B, the vehicle 2 accelerates from the vehicle stopped state, and then slows down after travelling at a constant speed, and then the vehicle 2 is stopped because the automatic brake system as the load 4 into which a large current flows is activated.

In this case, as shown in FIG. 5B, the power supply control apparatus 1 controls the elements such that the first and second switches SW1 and SW2 are on and that the DC-DC convertor 14 is in the stopped state in a time period from a time point at which the vehicle 2 starts to slow down at a predetermine speed (vehicle speed) or lower to a time point at which the idling stop system is activated. Moreover, when the travelling state of the vehicle 2 becomes the idling stop state, the power supply control apparatus 1 controls the first switch SW1 to be off, the second switch SW2 to be on and the DC-DC convertor 14 to be in the operating state.

In this case, as shown in FIG. 5B, when the automatic brake system that is a large current load is activated, the switching circuit 15 of the power supply control apparatus 1 turns on the first switch SW1. Further, the DC-DC convertor 14 is caused to be in the stopped state. Thus, the capacitor 5 and the load 4 are directly connected to each other so that the redundancy of the power supply system S can be ensured. Then, the vehicle 2 is stopped by the automatic brake system so that the automatic brake system, the large current load, ends operation, in other words, the automatic brake system is stopped. In this case, the power supply control apparatus 1 controls the elements to be returned to the states before the large current has flown into the load 4. In other words, the power supply control apparatus 1 controls the first switch SW1 to be off and the second switch SW2 to be on, and the DC-DC convertor 14 to be in the operating state.

Figure 6:
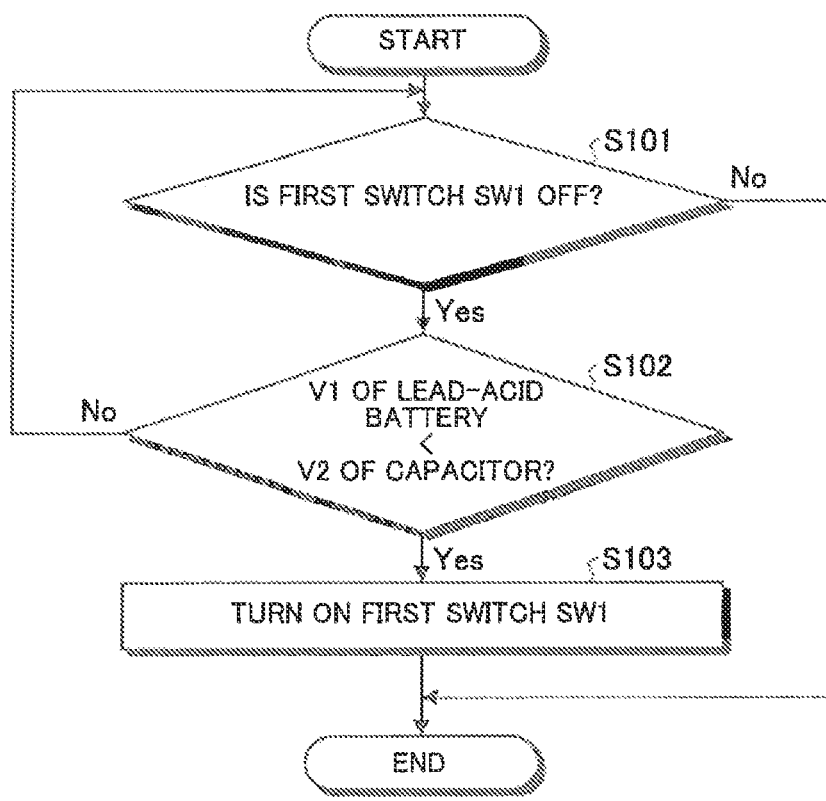
FIG. 6 is a flowchart illustrating a process procedure to control a first switch.

Next described will be a control process procedure performed by the power supply control apparatus 1 of this embodiment, with reference to FIG. 6. FIG. 6 is a flowchart illustrating the process procedure to control the first switch SW1. Since a control process procedure for the second switch SW2 is the same as the procedure for the first switch SW1 shown in FIG. 6, an explanation for the second switch SW2 will be omitted.

The power supply control apparatus 1 performs the process procedure shown in FIG. 6, for example, in a case where the power supply control apparatus 1 outputs the allowing signal that allows the first switching circuit 15a of the switching circuit 15 to switch the first switch SW1.

As shown in FIG. 6, the power supply control apparatus 1 determines whether or not the first switch SW1 is off (a step S101). In a case where the first switch SW1 is on (No in the step S101), the process ends. On the other hand, in a case where the first switch SW1 is off (Yes in the step S101), the power supply control apparatus 1 performs a comparison between the voltage V1 of the lead-acid battery 3 and the voltage V2 of the capacitor 5 (a step 102).

In a case where the voltage V1 of the lead-acid battery 3 is equal to or greater than the voltage V2 of the capacitor 5 (No in the step S102), the process returns to the step S101. On the other hand, the voltage V1 of the lead-acid battery 3 is smaller than the voltage V2 of the capacitor 5 (Yes in the step S102), the power supply control apparatus 1 turns on the first switch SW1 (a step S103), and then ends the process.

As described above, the power supply control apparatus 1 of this embodiment turns on at least one of the first and second switches SW1 and SW2 based on the voltage V1 of the lead-acid battery 3 and the voltage V2 of the capacitor 5. Thus, for example, even in the case where the load current increases or even in the case where the lead-acid battery 3 is defective, the power supply redundancy of the power supply system S can be ensured.

Figure 7:
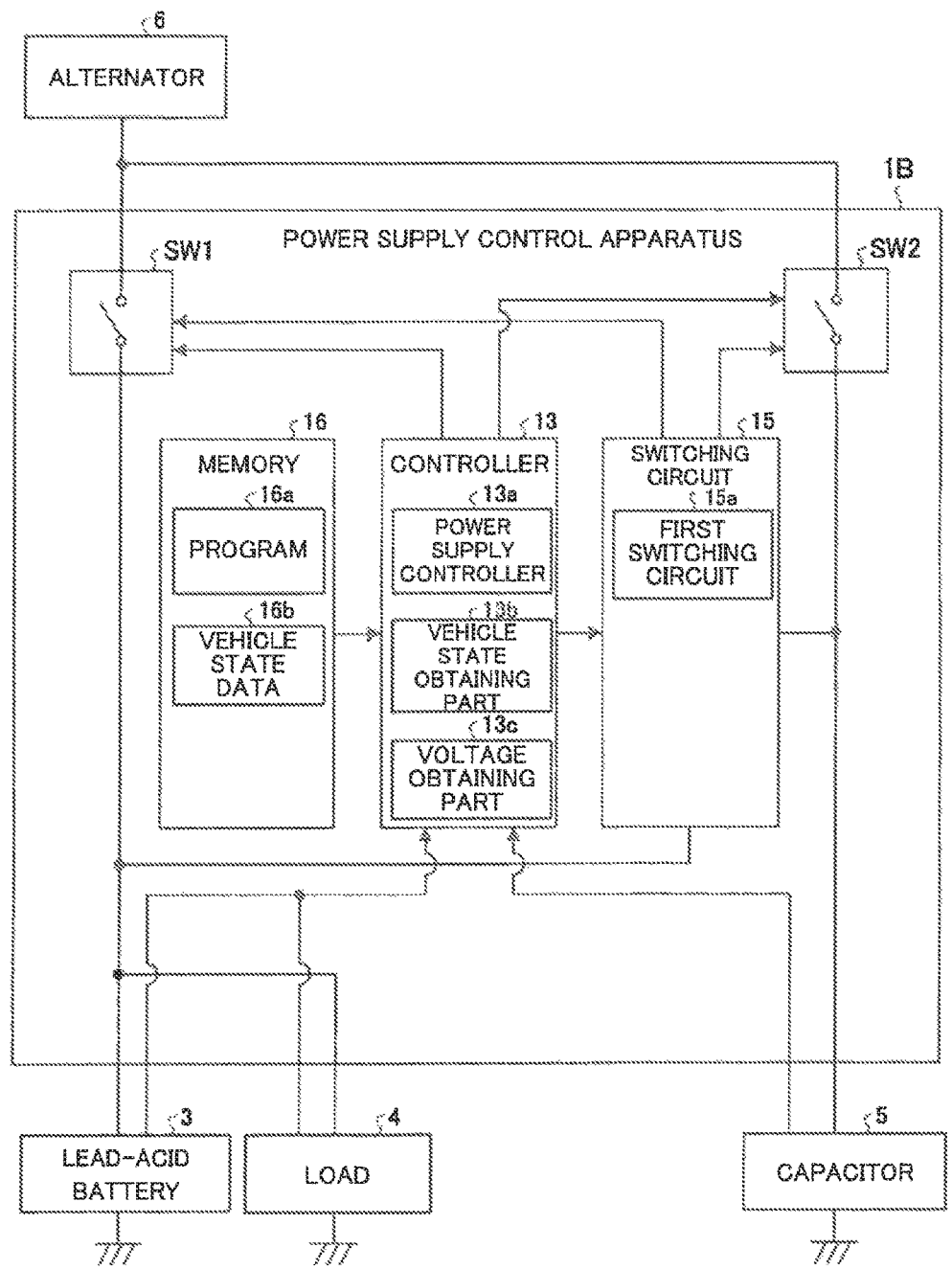
FIG. 7 illustrates a configuration of a power supply control apparatus of a modification of the embodiment.
Figure 8:
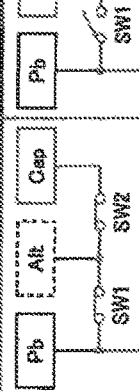
FIG. 8 illustrates states of elements of the power supply control apparatus of the modification.

Next, a power supply control apparatus 1B that is a modification of the embodiment will be described with reference to FIG. 7 and FIG. 8. In the foregoing embodiment, the case in which the power supply control apparatus 1 includes the DC-DC convertor 14 has been described. However, the power supply control apparatus 1 does not have to include a DC-DC convertor 14. The power supply control apparatus 1B shown in FIGS. 7 and 8 is the same as the power supply control apparatus 1 shown in FIG. 2 except having no DC-DC convertor 14. Thus, same numerical references will be given, and explanations for the elements will be omitted.

FIG. 7 illustrates a configuration of the power supply control apparatus 1B of this modification. The power supply control apparatus 1B shown in FIG. 7 is the same as the power supply control apparatus 1 in FIG. 2, except having no DC-DC convertor 14 and no second switching circuit 15b.

FIG. 8 illustrates states of elements of the power supply control apparatus 1B. Being same as the drawing in FIG. 4A, no numerical references are given to the drawing in FIG. 8 to simplify the drawing. Moreover, the explanation described with reference to FIG. 4A is omitted.

In a case where a voltage V1 of a lead-acid battery 3 is equal to or greater than a voltage V2 of a capacitor 5 while a travelling state of a vehicle 2 is "a normal travelling state," "a regeneration power charging state" or "an idling stop state," the power supply control apparatus 1B controls first and second switches SW1 and SW2 to be on. Therefore, even in a case where the voltage V1 of the lead-acid battery 3 decreases, the switching circuit 15 is not activated and the status quo is maintained.

In a case where the voltage V1 of the lead-acid battery 3 is equal to or greater than the voltage V2 of the capacitor 5 while the travelling state of the vehicle 2 is "an accelerating state/motor assistance state" or "an engine restart state," the power supply control apparatus 1B controls the first switch SW1 to be off and the second switch SW2 to be on.

In this case, when a large current flows into the load 4 so that the voltage V1 of the lead-acid battery 3 decreases, for example, when the automatic brake system is activated, a first switching circuit 15a of the power supply control apparatus 1B turns on the first switch SW1. Thus, the capacitor 5 is connected to the load 4, and thus power supply redundancy is ensured.

Modifications of this embodiment are not limited to the example described above. The embodiment and modifications described above and below may be combined with one another arbitrarily.

In the foregoing embodiment, the DC-DC convertor 14 is included in the power supply control apparatus 1. However, the DC-DC convertor 14 may include the power supply control apparatus 1. In other words, the DC-DC convertor 14 may include the first and second switches SW1 and SW2, a controller 13, a switching circuit 15 and a memory 16.

Moreover, the foregoing embodiment uses the lead-acid battery 3 having lead electrodes as a main power supply for the electric devices mounted on the vehicle 2. However, the main power supply may be any secondary battery that can be a power supply for the electric devices mounted on the vehicle 2. The main power supply does not have to be the lead-acid battery 3. For example, a silicon battery may be used as the main power supply.

Moreover, the foregoing embodiment uses the capacitor 5 as the auxiliary power supply for the electric devices that are mounted on the vehicle 2. However, the auxiliary power supply does not have to be the capacitor 5 but any secondary battery that can be used as the auxiliary power supply for the electric devises that are mounted on the vehicle 2. For example, a lithium-ion battery or a nickel hydride battery may be used as the auxiliary power supply.

In the foregoing embodiment, the power supply control apparatus 1 is mounted in a vehicle. However, the power supply control apparatus 1 may be mounted, for example, on a motor cycle, a train, an airplane, a ship, a boat or other transportation equipment. Moreover, the power supply control apparatus 1 may be mounted on an elevating machine, such as an elevator and an escalator. In other words, the power supply control apparatus 1 may be mounted on an object: that is connected to a power supply and a load to control charging/discharging to/from the power supply; and that controls a current flow to the load.

Moreover, a configuration described as hardware may be implemented by software. On the other hand, a function described as software may be implemented by hardware. The hardware or the software may be implemented by a combination of hardware and software. For example, based on information to activate the automatic brake system, etc., software may control electricity to be supplied to the load 4.

The power supply control apparatus 1 and the power supply control apparatus 1B in the foregoing embodiment and the modification are vehicle power supply control apparatuses (i) that store electricity generated by the alternator 6 powered by the internal combustion engine EN of the vehicle 2 and (ii) that control the main power supply (lead-acid battery) 3 and the auxiliary power supply (capacitor) 5 that supply the stored electricity to the load 4. Each of the vehicle power supply control apparatuses includes the first switch SW1, the second switch SW2, the controller 13 and the switching circuit 15. The first switch SW1 is provided between the main power supply 3 and the alternator 6. The second switch SW2 is provided between the auxiliary power supply 5 and the alternator 6. The controller 13 controls the connection state of the first switch SW1 and the second switch SW2 based on the state of the vehicle 2. In a case where the voltage V1 of the main power supply 3 is smaller than the voltage V2 of the auxiliary power supply 5 by the threshold value or greater, the switching circuit 15 turns on the first switch SW1 and/or the second switch SW2.

Thus, the auxiliary power supply 5 and the load 4 are directly connected to each other so that the redundancy of the power supply system S including the main power supply 3 and the auxiliary power supply 5 call be ensured.

The switching circuit 15 in the foregoing embodiment and the modification turns on the first switch SW1 and/or the second switch SW2 regardless of control by the controller 13.

Thus, the auxiliary power supply 5 and the load 4 are directly connected to each other regardless of the control by the controller 13. Therefore, the redundancy of the power supply system S including the main power supply 3 and the auxiliary power supply 5 can be ensured.

In the foregoing embodiment and the modification, the switching circuit 15 includes the comparator 15*a*1 and the switch drive circuit 15*a*2. The comparator 15*a*1 performs the comparison between the voltage V1 of the main power supply 3 and the voltage V2 of the auxiliary power supply 5. The switch drive circuit 15*a*2 turns on the first switch SW1 and/or the second switch SW2 based on the result of the comparison performed by the comparator 15*a*1.

Thus, the switching circuit 15 can be configured with an analogue circuit so that a response speed of the switching circuit 15 can be improved. Therefore, in a case where a voltage of the main power supply 3 suddenly drops, the redundancy of the power supply can be ensured faster.

In the foregoing embodiment and the modification, in the case where the internal combustion engine EN is stopped while the vehicle 2 is slowing down at the first predetermined speed or lower, when the voltage V1 of the main power supply 3 becomes smaller than the voltage V2 of the auxiliary power supply 5 by the threshold value or greater, the switching circuit 15 turns on the first switch SW1.

Thus, even in a case where so-called idling stop system of the vehicle 2 is operating, the redundancy of the power supply system S including the main power supply 3 and the auxiliary power supply 5 can be ensured. Moreover, the internal combustion engine EN is stopped so that fuel efficiency can be improved.

In the foregoing embodiment and the modification, while the vehicle 2 is travelling at the second predetermined speed or greater, when the voltage V1 of the main power supply 3 becomes smaller than the voltage V2 of the auxiliary power supply 5 by the threshold value or greater, the switching circuit 15 turns on the second switch SW2.

Thus, even in a case where the vehicle 2 is travelling, the redundancy of the power supply system S including the main power supply 3 and the auxiliary power supply 5 can be ensured.

In the foregoing embodiment, the vehicle power supply control apparatus 1 is provided between the auxiliary power supply 5 and the load 4, and the vehicle power supply control apparatus 1 further includes the DC-DC convertor 14 that convers the direct-current voltage of the auxiliary power supply 5. While the electricity is provided to the load 4 from the auxiliary power supply 5 via the DC-DC convertor 14, when the voltage V1 of the main power supply 3 becomes smaller than the voltage V2 of the auxiliary power supply 5 by the threshold value or greater, the switching circuit 15 turns on the first switch SW1.

Thus, even in the case where the DC-DC convertor 14 is operating, the redundancy of the power supply system S including the main power supply 3 and the auxiliary power supply. 5 can be ensured.

More effects and modifications of the embodiment can be easily derived by a person skilled in the art. Thus, the detailed and representative embodiment described above does not intend to limit broader modes of the invention. Therefore, various changes are possible without departing from the comprehensive concept and spirit of the invention defined in the attached claims and equivalents thereof.

While the invention has been shown and described in detail, the foregoing description is in all aspects illustrative and not restrictive. It is therefore understood that numerous other modifications and variations can be devised without departing from the scope of the invention.

What is claimed is:

1. A vehicle power supply control apparatus that (i) controls storage of electricity generated by an alternator that is powered by an internal combustion engine of a vehicle and (ii) controls a main power supply and an auxiliary power supply that supply the electricity stored therein to a load, the vehicle power supply control apparatus comprising:
   a first switch that is provided between the main power supply and the alternator;
   a second switch that is provided between the auxiliary power supply and the alternator;
   a microcomputer that controls a connection state of the first switch and a connection state of the second switch based on a state of the vehicle; and
   a switching circuit that turns on the first switch and/or the second switch so that both the first and second switches are closed based on a determination that a first voltage of the main power supply is smaller than a second voltage of the auxiliary power supply by a difference value that is equal to or greater than a threshold value, wherein
   the switching circuit turns on the first switch and/or the second switch so that both the first and second switches are closed regardless of control of the first and second switches by the microcomputer, by use of a switching signal control path that connects the switching circuit to the first and second switches without passing through the microcomputer, the switching signal control path being different from a control signal control path by which the microcomputer is connected to the first and second switches to control the first and second switches.

2. The vehicle power supply control apparatus according to claim 1, wherein
   the switching circuit includes:
      a comparator that performs a comparison between the first voltage of the main power supply and the second voltage of the auxiliary power supply; and
      a switch drive circuit that turns on the first switch and/or the second switch based on a result of the comparison.

3. The vehicle power supply control apparatus according to claim 1, wherein
   the switching circuit controls the first and second switches so that the first and second switches both are on when the first voltage of the main power supply becomes smaller than the second voltage of the auxiliary power supply by the difference value that is equal to or greater than the threshold value while the internal combustion engine is stopped while the vehicle is slowing down at a first predetermined speed or at a speed lower than the first predetermined speed.

4. The vehicle power supply control apparatus according to claim 1, wherein
the switching circuit controls the first and second switches so that the first and second switches both are on when the first voltage of the main power supply becomes smaller than the second voltage of the auxiliary power supply by the difference value that is equal to or greater than the threshold value while the vehicle is travelling at a second predetermined speed or at a speed greater than the second predetermined speed.

5. The vehicle power supply control apparatus according to claim 1, further comprising:
a direct-current converter that converts a direct voltage of the auxiliary power supply, the direct-current converter being provided between the auxiliary power supply and the load,
wherein the switching circuit controls the first and second switches so that the first and second switches both are on when the first voltage of the main power supply becomes smaller than the second voltage of the auxiliary power supply by the difference value that is equal to or greater than the threshold value to cause the electricity provided from the auxiliary power supply to reach the load while bypassing the direct-current converter.

6. A vehicle power supply system comprising:
an alternator that generates electricity and is powered by an internal combustion engine of a vehicle;
a main power supply and an auxiliary power supply that:
(i) store the electricity generated by the alternator and
(ii) supply the stored electricity to a load;
a first switch that is provided between the main power supply and the alternator;
a second switch that is provided between the auxiliary power supply and the alternator
a microcomputer that controls a connection state of the first switch and a connection state of the second switch based on a state of the vehicle; and
a switching circuit that turns on the first switch and/or the second switch so that both the first and second switches are closed based on a determination that a first voltage of the main power supply is smaller than a second voltage of the auxiliary power supply by a difference value that is equal to or greater than a threshold value, wherein
the switching circuit turns on the first switch and/or the second switch so that both the first and second switches are closed regardless of control of the first and second switches by the microcomputer, by use of a switching signal control path that connects the switching circuit to the first and second switches without passing through the microcomputer, the switching signal control path being different from a control signal control path by which the microcomputer is connected to the first and second switches to control the first and second switches.

7. A power supply control method of (i) controlling storage of electricity generated by an alternator that is powered by an internal combustion engine of a vehicle and (ii) controlling a main power supply and an auxiliary power supply that supply the electricity stored therein to a load, the power supply control method comprising:
a microcomputer controlling a connection state of a first switch and a connection state of a second switch based on a state of the vehicle, the first switch being provided between the main power supply and the alternator, the second switch being provided between the auxiliary power supply and the alternator; and
a switching circuit turning on the first switch and/or the second switch so that both the first and second switches are closed based on a determination that a first voltage of the main power supply is smaller than a second voltage of the auxiliary power supply by a difference value that is equal to or greater than a threshold value, wherein
the switching circuit turns on the first switch and/or the second switch so that both the first and second switches are closed regardless of control of the first and second switches by the microcomputer, by use of a switching signal control path that connects the switching circuit to the first and second switches without passing through the microcomputer, the switching signal control path being different from a control signal control path by which the microcomputer is connected to the first and second switches to control the first and second switches.

8. The vehicle power supply control apparatus according to claim 1, wherein
the first switch is provided between the main power supply and a junction point to which the alternator is electrically connected, the alternator connected to the junction point not through the first switch;
the second switch is provided between the auxiliary power supply and the junction point to which the alternator is electrically connected; and
the auxiliary power supply is electrically connected to the load to supply the electricity stored in the auxiliary power supply to the load through the closed second switch, the junction point and the closed first switch when both the first and second switches are closed.

9. The vehicle power supply system according to claim 6, wherein
the first switch is provided between the main power supply and a junction point to which the alternator is electrically connected, the alternator connected to the junction point not through the first switch;
the second switch is provided between the auxiliary power supply and the junction point to which the alternator is electrically connected; and
the auxiliary power supply is electrically connected to the load to supply the electricity stored in the auxiliary power supply to the load through the closed second switch, the junction point and the closed first switch when both the first and second switches are closed.

10. The power supply method according to claim 7, wherein
the first switch is provided between the main power supply and a junction point to which the alternator is electrically connected, the alternator connected to the junction point not through the first switch;
the second switch is provided between the auxiliary power supply and the junction point to which the alternator is electrically connected; and
the auxiliary power supply is electrically connected to the load to supply the electricity stored in the auxiliary power supply to the load through the closed second switch, the junction point and the closed first switch when both the first and second switches are closed.

* * * * *